United States Patent
Beard et al.

(10) Patent No.: US 10,864,990 B2
(45) Date of Patent: Dec. 15, 2020

(54) MANIFOLD ASSEMBLY WITH INTEGRATED VENT AND FLOW CONTROL PORTS

(71) Applicant: B/E Aerospace, Inc., Winston-Salem, NC (US)

(72) Inventors: John H. Beard, Olathe, KS (US); Brian P. Mills, Blue Springs, MO (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/293,368

(22) Filed: Mar. 5, 2019

(65) Prior Publication Data
US 2020/0283152 A1    Sep. 10, 2020

(51) Int. Cl.
| B64D 11/00 | (2006.01) |
| A47J 31/46 | (2006.01) |
| F16K 24/04 | (2006.01) |
| F16K 11/22 | (2006.01) |
| F16K 11/24 | (2006.01) |

(52) U.S. Cl.
CPC ......... *B64D 11/0007* (2013.01); *A47J 31/461* (2018.08); *A47J 31/469* (2018.08); *F16K 11/22* (2013.01); *F16K 11/24* (2013.01); *F16K 24/04* (2013.01)

(58) Field of Classification Search
CPC ..... Y10T 137/86493; Y10T 137/87917; Y10T 137/87877; B64D 11/0007; A47J 31/461; A47J 31/469
See application file for complete search history.

(56) References Cited

U.S. PATENT DOCUMENTS

| 3,190,310 | A | * | 6/1965 | Honsinger | A47J 31/461 |
| | | | | | 137/583 |
| 3,516,638 | A | * | 6/1970 | Piggott | F16K 5/0657 |
| | | | | | 251/175 |
| 6,216,739 | B1 | * | 4/2001 | Fukushima | F16K 27/003 |
| | | | | | 137/613 |
| 2003/0003208 | A1 | * | 1/2003 | Lassota | A47J 31/52 |
| | | | | | 426/433 |
| 2010/0012204 | A1 | * | 1/2010 | Stretch | F16K 31/445 |
| | | | | | 137/565.01 |
| 2012/0073685 | A1 | * | 3/2012 | Morgan | F16K 27/0236 |
| | | | | | 137/613 |

FOREIGN PATENT DOCUMENTS

DE    4036068 A1 *  5/1992  ............ A47J 31/461

* cited by examiner

*Primary Examiner* — Kevin R Barss
(74) *Attorney, Agent, or Firm* — Suiter Swantz pc llo (57) ABSTRACT

A hot beverage maker manifold assembly is disclosed integrating components into the manifold body minimizing leak paths and creating efficient overall drain and vent performance of the aircraft hot beverage maker. A top vent valve is integrated into the manifold body for complete venting and draining performance in the manifold assembly as well as in an associated hot water tank and tank lines. An incorporated flow regulator housing within the manifold body at a tea line exit fitting limits the number of downstream leak paths and complexity. An integrated lower manifold clean out port allows for efficient bi-directional service of the manifold and efficient descaling and flushing.

20 Claims, 9 Drawing Sheets

FIG. 6

MANIFOLD ASSEMBLY WITH INTEGRATED VENT AND FLOW CONTROL PORTS

BACKGROUND

Traditional hot beverage manifolds may inherently limit operation and cause high maintenance costs. Machined manifolds maintain a high cost of production using raw materials and time-consuming manufacture methods. Multiple assemblies including in line vent valves and flow regulators maintain a high risk for leak and failure.

Traditional hot beverage systems may include a cumbersome and inefficient drain capability causing a threat of undrained freezing portions which may cause damage. Further, time consuming clean out and descaling procedures require additional down time and increased cost to an operator.

Therefore, a need remains for a system and related method which may overcome these limitations and provide a lightweight, molded manifold assembly solution comprising each desired element incorporated within the manifold assembly.

SUMMARY

In one aspect, embodiments of the inventive concepts disclosed herein are directed to a manifold assembly system. The manifold system may comprise a manifold body configured for coupling with an aircraft beverage maker, the manifold body having a center channel having an input port, three distribution ports aligned along, approximately normal to, and in fluid connectivity with the center channel, a top vent port aligned and in fluid connectivity with the center channel, and a bottom flush port aligned and in fluid connectivity with the center channel.

To regulate a flow of hot water between the center channel and the exit fittings, a solenoid valve may be mechanically coupled and associated with each distribution port. For venting a vent valve may be mechanically coupled and associated with the top vent port. For distribution, an exit fitting may be associated with each distribution port, each exit fitting may be in valved fluid connectivity with its associated distribution port.

For control of operation of the manifold assembly, a controller may be operatively coupled with each solenoid valve and a tangible, non-transitory memory may be configured to communicate with the controller, the tangible, non-transitory memory having instructions stored therein that, in response to execution by the controller, cause the controller to execute the various commends of the hot beverage maker. The controller may receive an input from a user of an aircraft hot beverage device and control a flow of hot water from the center channel to the exit fittings via a signal sent to operate at least one solenoid valves.

A further embodiment of the inventive concepts disclosed herein may include a manifold body having a top end and an opposite bottom end. The manifold body may include a center channel extending along a vertical axis from the manifold body top end to the manifold body bottom end, the center channel having an input port. The manifold body may include a top vent port proximal with the manifold body top end and in fluid connectivity with the center channel and a top vent valve coupled with the top vent port, the top vent valve comprising a connection port, a float, and a vent fitting. The manifold body may also include a bottom flush port proximal with the manifold body bottom end and in fluid connectivity with the center channel.

Here, the top vent port, the center channel, and the bottom vent port create an open center conduit each be aligned with the vertical axis. Along the vertical axis, three distribution ports may be oriented approximately normal to the vertical axis and in fluid connectivity with the center channel, each distribution port configured to receive a solenoid valve. An exit fitting may be associated with each distribution port, each exit fitting oriented approximately normal with both of the vertical axis and its associated distribution port, each exit fitting in valved fluid connectivity with its associated distribution port. To regulate flow to a tea line, at least one of the exit fitting may include a flow regulator.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a hot beverage maker manifold assembly is disclosed integrating components into the manifold body minimizing leak paths and creating efficient overall drain and vent performance of the aircraft hot beverage maker. A top vent valve is integrated into the manifold body for complete venting and draining performance in the manifold assembly as well as in an associated hot water tank and tank lines. An incorporated flow regulator housing within the manifold body at a tea line exit fitting limits the number of downstream leak paths and complexity. An integrated lower manifold clean out port allows for efficient bi-directional service of the manifold and efficient descaling and flushing.

| Reference Chart | |
|---|---|
| 100 | Manifold Assembly System |
| 110 | Manifold Body |
| 112 | Brew Solenoid Valve |
| 114 | Hot Water Solenoid Valve |

| Reference Chart | |
|---|---|
| 116 | Tea Solenoid Valve |
| 118 | Chassis Connection |
| 120 | Top Vent Port |
| 122 | Top Vent Valve |
| 124 | Top Vent Fitting |
| 130 | Bottom Flush Port |
| 132 | Flush Port Plug |
| 140 | Center Channel |
| 142 | Brew Exit Fitting |
| 144 | Hot Water Exit Fitting |
| 146 | Tea Exit Fitting |
| 150 | Hot Water Tank |
| 152 | Brew Line |
| 154 | Hot Water Line |
| 156 | Tea Line |
| 158 | Tank Line |
| 160 | Input Port |
| 162 | Tank Drain |
| 172 | Brew Dispenser |
| 174 | Hot Water Dispenser |
| 176 | Tea Dispenser |
| 180 | Controller |
| 182 | User Selector |
| 184 | Memory |
| 200 | Installed Manifold Assembly |
| 256 | Flow Regulator |
| 300 | Exploded View |
| 312 | Plunger |
| 314 | O Ring |
| 316 | Guide |
| 318 | Retaining Nut |
| 320 | Clip |
| 350 | Vertical Axis |
| 352 | Lateral Axis |
| 354 | Longitudinal Axis |
| 400 | Manifold Body View |
| 412 | Brew Distribution Port |
| 414 | Hot Water Distribution Port |
| 416 | Tea Distribution Port |
| 500 | Vent Valve Views |
| 502 | Vent Valve Base |
| 504 | Lower Port |
| 506 | Vent Valve Ball |
| 508 | Upper Port |
| 510 | Vent Valve Housing |
| 512 | Connection Port |
| 600 | Hot Beverage Maker View |
| 610 | Hot Beverage Maker |
| 612 | Aircraft Water Inlet |
| 614 | Power Connector |
| 616 | Manifold Wiring Harness |

FIG. 1

Figure 1:
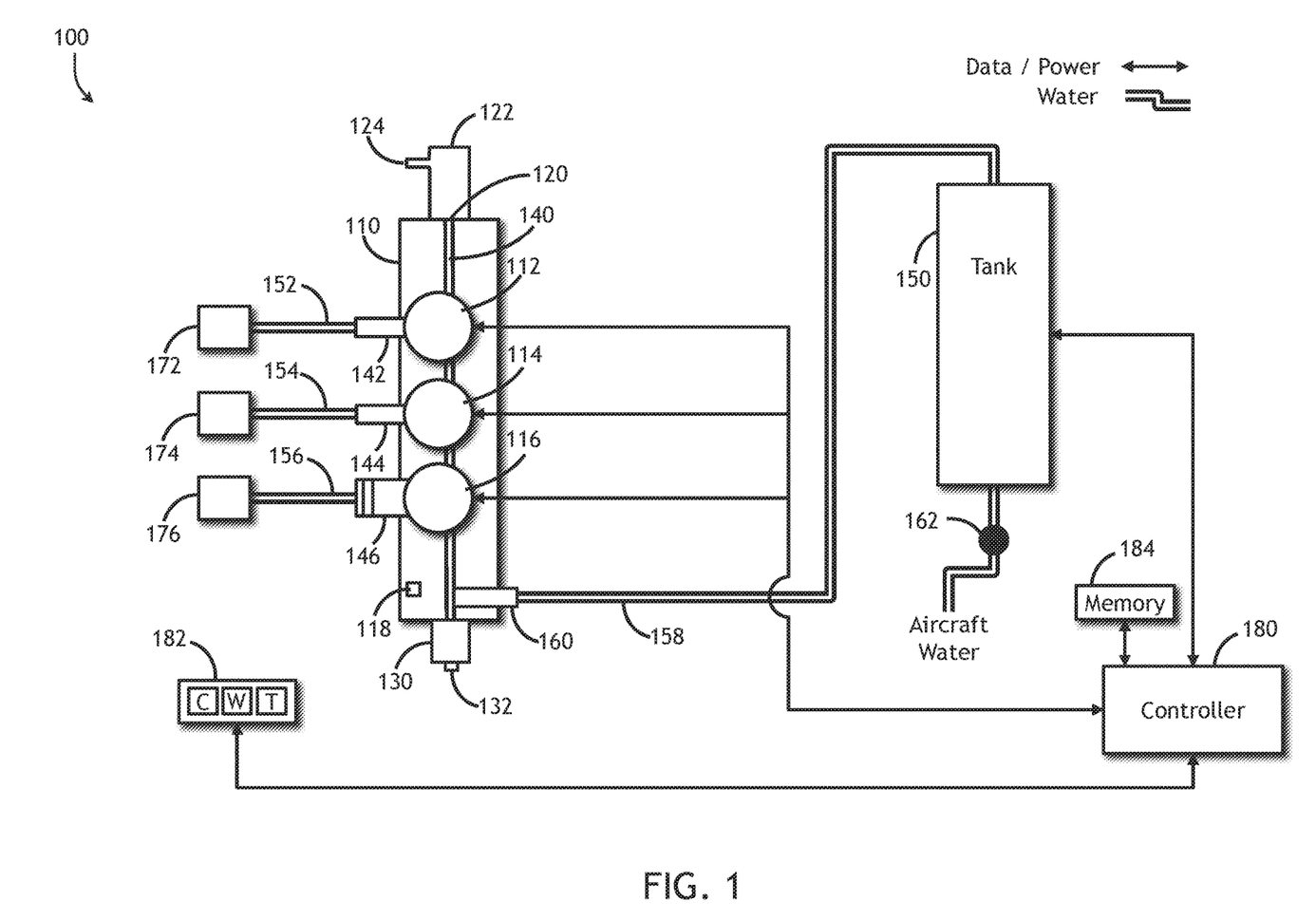
FIG. 1 is a diagram of an overview plumbing schematic of a manifold assembly system in accordance with an embodiment of the inventive concepts disclosed herein.

Referring now to FIG. 1, a diagram of an overview plumbing schematic of a manifold assembly system in accordance with an embodiment of the inventive concepts disclosed herein is shown. A manifold assembly system 100 may include a manifold body 110 configured for distribution of hot water to an aircraft hot beverage maker. Within the manifold body 110, a center channel 140 may extend from end to end along a vertical axis. An input port 160 may supply the manifold center channel 140 with hot water from a tank line 158 from a tank 150. A chassis connection 118 may function to provide a mechanical coupling with a chassis of an aircraft hot beverage maker.

To distribute water to the various portions of the aircraft hot beverage maker, three distribution ports for coffee 412, hot water 414, and tea 416 (FIG. 4) may be vertically aligned along and in fluid connectivity with the center channel 140. Associated with each distribution port, solenoid valves for coffee brew 112, hot water 114, and tea 116 mechanically couple with each distribution port and function to valve a flow a hot water between the center channel 140 and each of an associated exit fitting for coffee brew 142, hot water 144, and tea 146.

A top vent port 120 aligned and in fluid connectivity with the center channel 140 may provide function to the manifold assembly for venting during a system fill and offering a source of air for draining of the system during a system drain. In this manner, the top vent port and associated top vent valve and vent fitting 124 may provide function to the manifold assembly system 100 to enable a complete drain of the manifold assembly body 110, the tank line 158 and the tank 150 as a tank drain 162 is opened while aircraft water pressure may be removed. Conversely, while an aircraft water supply is pressurized and a tank drain valve 162 is open, the top vent valve may open allowing an exit point for system wide air enabling a complete fill of the tank 150, tank line 158 and center channel 140. In addition to providing function to the manifold assembly 100, the top vent port may allow, in molded construction, enabling use of a core pin creating the top vent port 120 as well as a top portion of the center channel 140.

A bottom flush port 130 may be aligned and in fluid connectivity with the center channel 140. In one embodiment of the inventive concepts disclosed herein, the bottom flush port 130 may provide multiple function. One function may include an ability, in molded construction, to enable a core pin to be used creating the bottom flush port 130 as well as a bottom portion of the center channel 140. An additional function may include an ability to remove a bottom flush port plug 132 allowing for efficient cleaning as well as a gravity removal of debris from the manifold assembly 110. A flush port plug 132 may mechanically couple and seal the bottom flush port 130 during operation while enabling efficient flushing and gravity drain of the manifold body 110.

A controller 180 may operatively couple with each solenoid valve including brew 112, hot water 114, tea 116 to control function (e.g., open and close) of each solenoid valve to control function of each valve. The controller 180 may also provide additional function to the hot beverage maker. Associated with the controller 180, a tangible, non-transitory memory 184 may be configured to communicate with the controller, the tangible, non-transitory memory having instructions stored therein that, in response to execution by the controller, cause the controller to perform function associated with the hot beverage maker. Here, such function may include receiving an input from a user of the aircraft hot beverage device via a user selector 182 and sending a signal (electric and or data) to operate each solenoid valves controlling the flow of hot water from the center channel 140 to one of the fittings for brew 142, hot water 144, and tea 146.

Coupled with each fitting 142 144 146, associated lines for brew 152, hot water 154, and tea 156 may provide connectivity to each dispenser of the hot beverage maker including an associated brew dispenser 172, hot water dispenser 174, and tea dispenser 176.

For example, a user may select a coffee button on the user selector 182 sending a signal to the controller 180. The controller 180 may send an open signal to the brew solenoid valve 112 causing the valve to open and provide hot water from the center channel 140 through the brew distribution port 412 (FIG. 4) to the brew line 152 and ultimately the brew dispenser 172. The controller may receive a full indication from the hot beverage maker and send a close signal to the brew solenoid valve 112 stopping the hot water flow from the center channel 140.

FIG. 2

Figure 2:
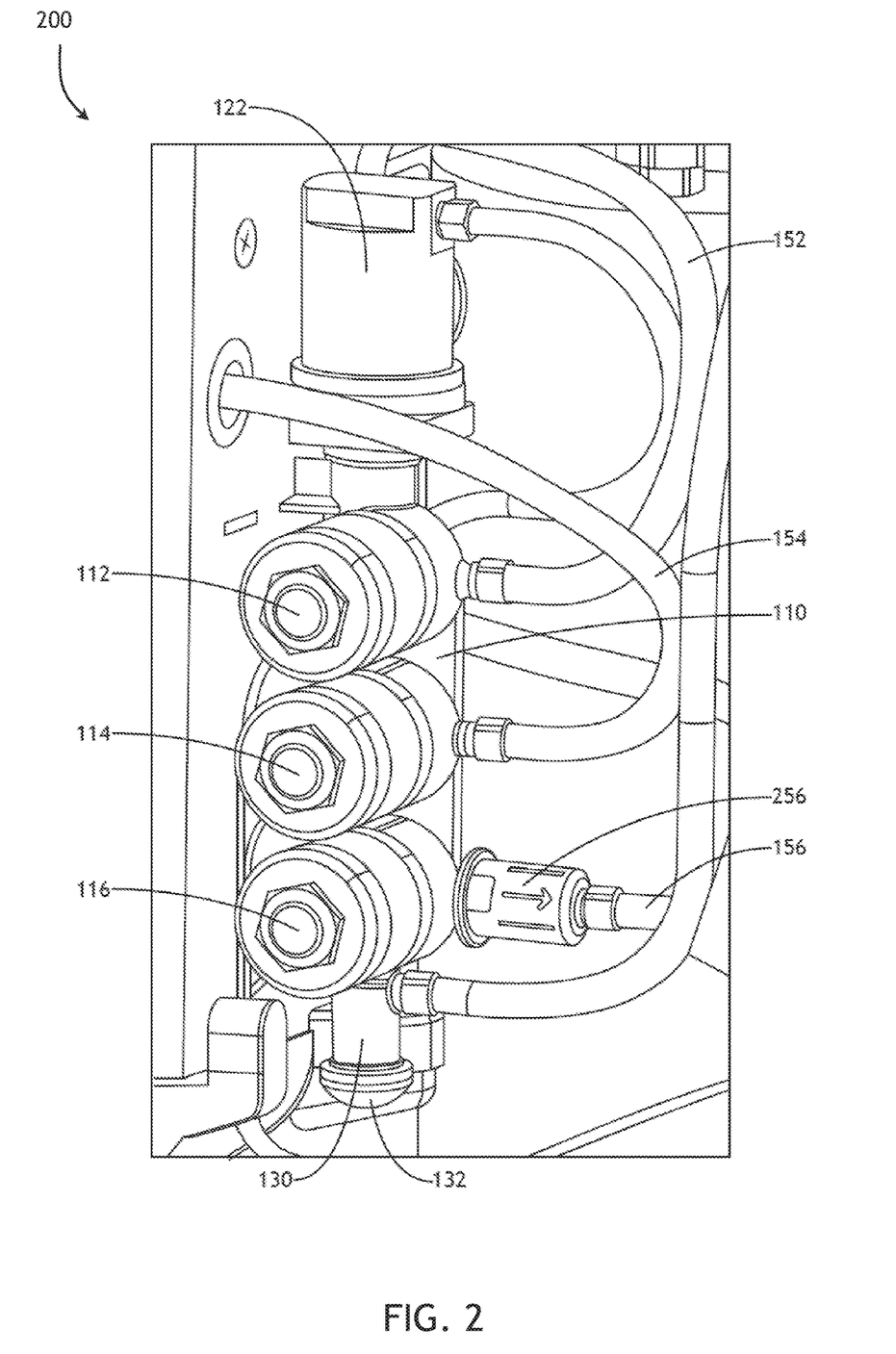
FIG. 2 is a diagram of an installed manifold assembly within a beverage maker in accordance with an embodiment of the inventive concepts disclosed herein.

Referring to FIG. 2, a diagram of an installed manifold assembly within a beverage maker in accordance with an embodiment of the inventive concepts disclosed herein is shown. An installed manifold assembly 200 may detail an accurate representation of element alignment and installation. Here, each solenoid valve 112 114 116 may be vertically aligned and connected with each associated line for brew 152, hot water 154, and tea 156. Here also, the tea line 156 may include an integrated flow regulator 256. The flow regulator 256 may function to reduce a flow of hot water as the flow may leave the tea solenoid valve 116.

FIG. 3

Figure 3:
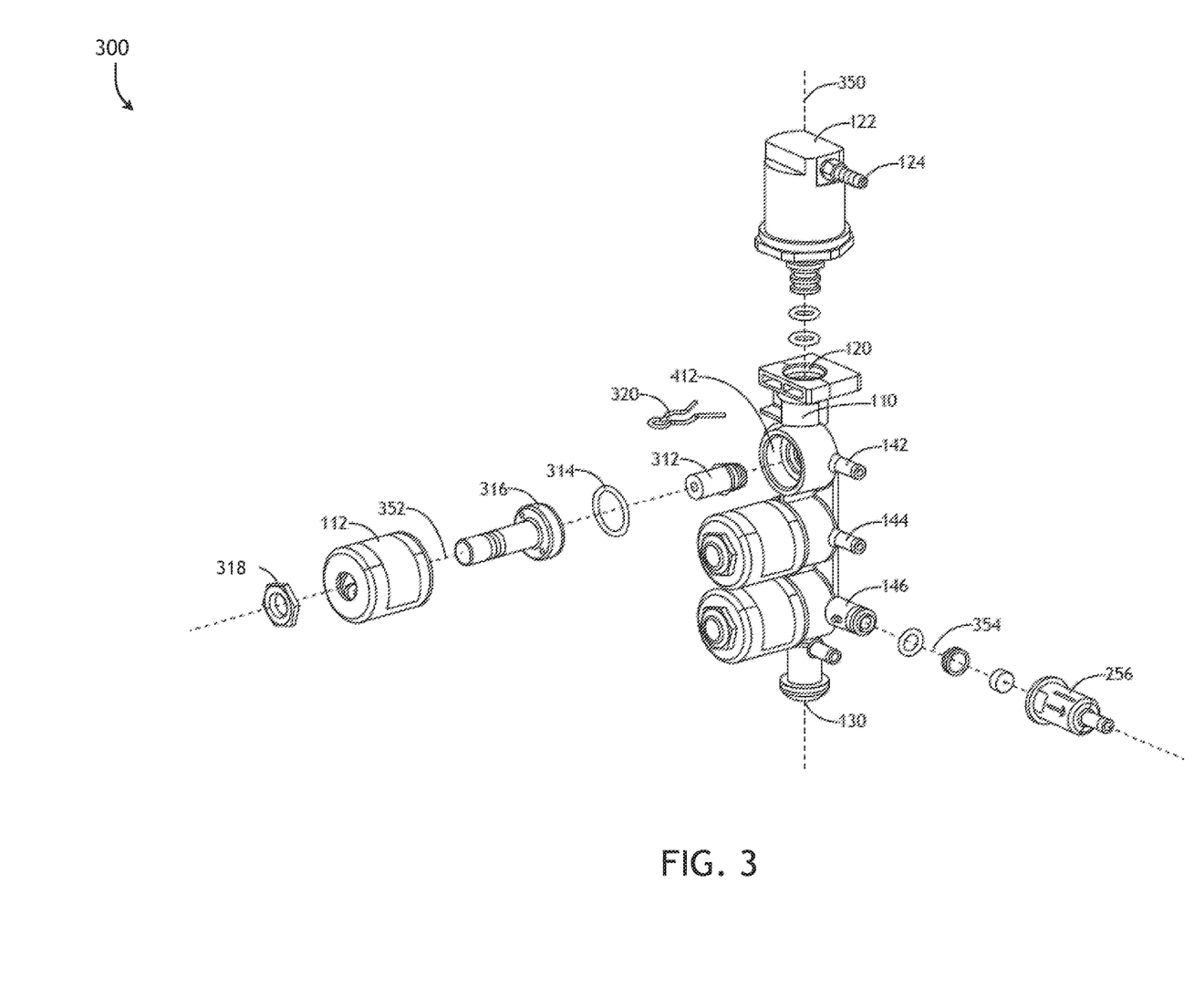
FIG. 3 is a diagram of an exploded view of a solenoid valve and manifold assembly exemplary of an embodiment of the inventive concepts disclosed herein.

Referring to FIG. 3, a diagram of an exploded view of a solenoid valve and manifold assembly exemplary of an embodiment of the inventive concepts disclosed herein is shown. Exploded view 300 may indicate each element associated with the manifold assembly. The manifold body 110 including each of the top vent port 120 and the bottom flush port 130. Each exit fitting including brew exit fitting 142, hot water exit fitting 144, and tea exit fitting 146 may be indicated and oriented parallel to a longitudinal axis 354 and approximately normal to a vertical axis 350 as well as approximately normal to each of the distribution ports 412, 414, 416. Of note, tea exit fitting 146 may be specifically configured to receive and integrate with the flow regulator 256 to maintain a low flow rate to maintain water temperature and limit leak exposure downstream in any lines.

Of note, in this application the term approximately may be used in the specification and claims. Here, the term approximately may be defined as plus or minus 20% of the value to which the term is referred. For example, approximately normal may include values +/−20% of 90 degrees inclusive of 72 degrees to 108 degrees.

Each solenoid valve (here brew solenoid valve 112 shown) may include a plunger 312, an O ring 314, a guide 316 and a retaining nut 318 each oriented approximately parallel to a lateral axis 352. The plunger 312 may function as the physical barrier to the flow of hot water from the center channel 140 to the brew exit fitting 142.

A clip 320 may function to retain the top vent valve 122 in place within the top vent port 120. In one embodiment of the inventive concepts disclosed herein, the clip 320 may be easily removed by a user to remove the top vent valve 122 allowing efficient access to the center channel 140 for ease in flushing and descaling the entire system.

FIG. 4

Figure 4A:
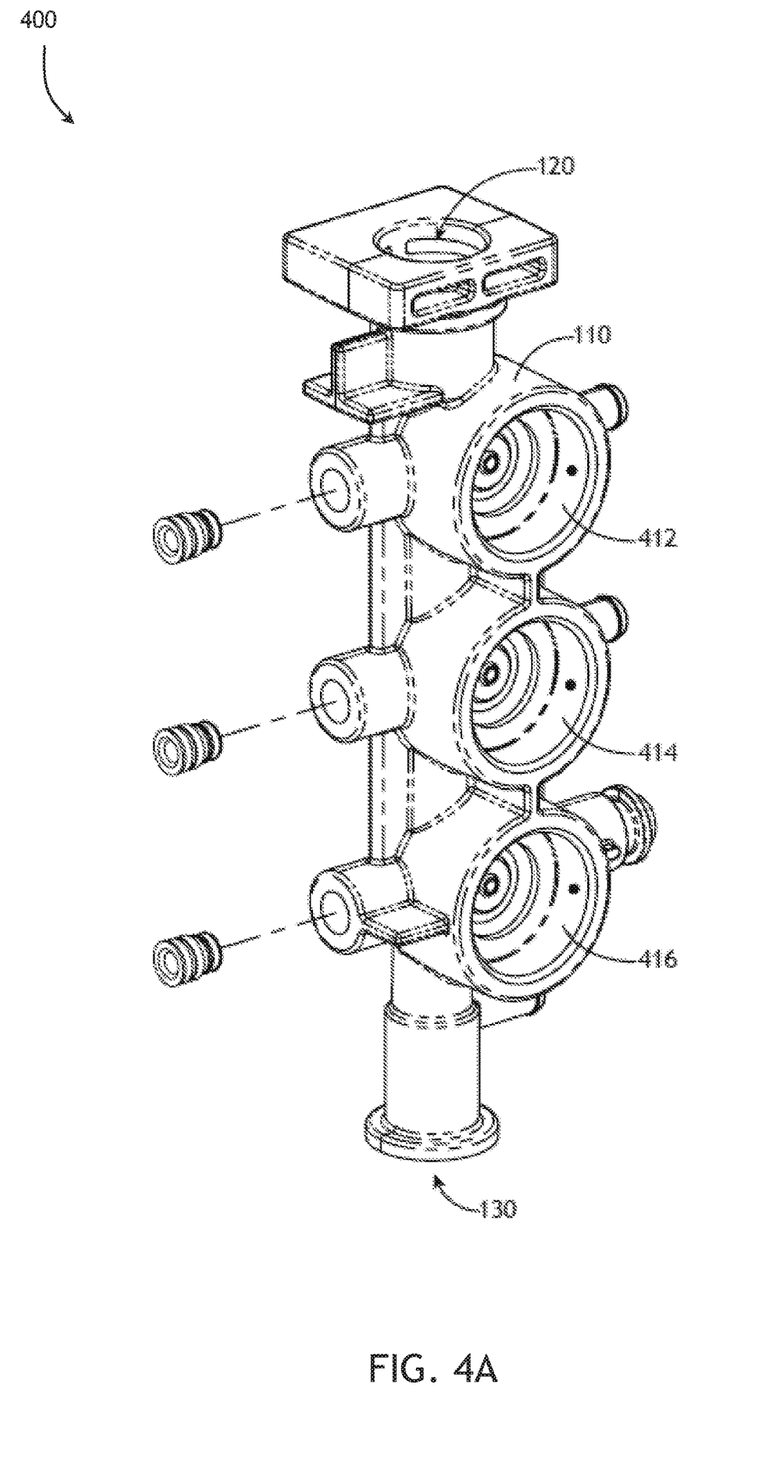
FIGS. 4A-4C are diagrams of a manifold body exemplary of one embodiment of the inventive concepts disclosed herein.
Figure 4B:
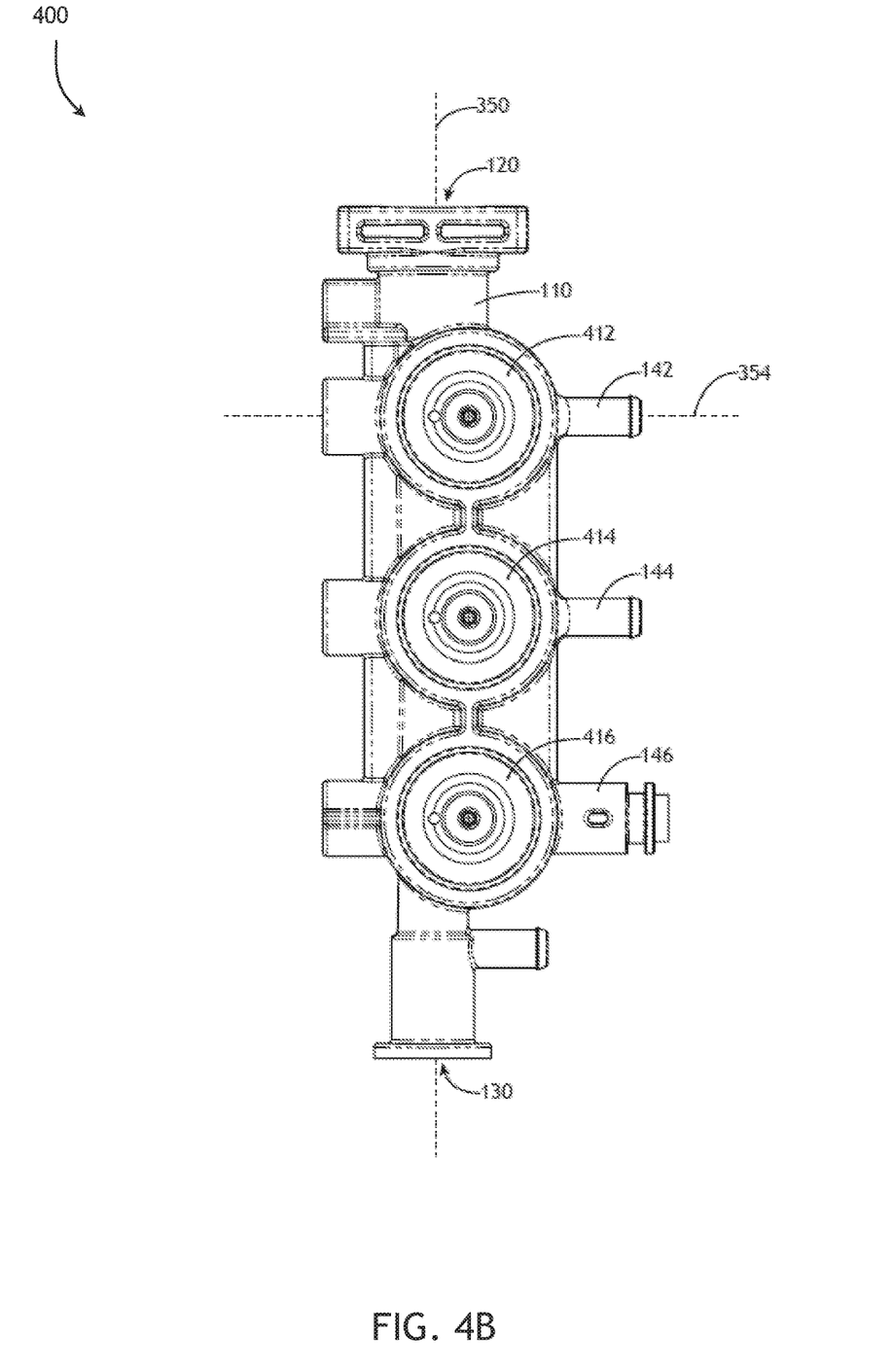
Figure 4C:
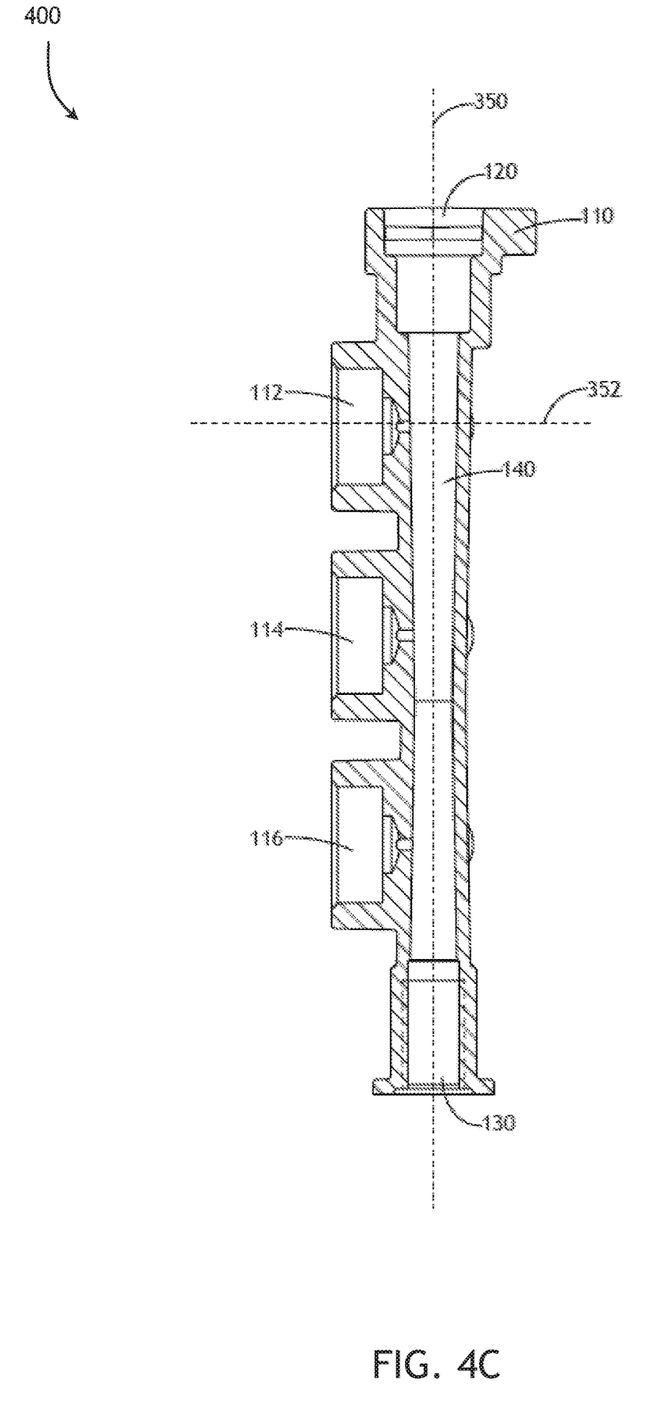

Referring now to FIG. 4A-4C, diagrams of a manifold body exemplary of one embodiment of the inventive concepts disclosed herein is shown. Manifold body view 400 may indicate the manifold body 110 without additional elements attached. A total overall vertical dimension of the manifold body 110 may be approximately 4.503 inches from a top end proximal with the upper vent port 120 to the bottom end proximal with the bottom flush port 130. Seen here are each distribution port for brew 412, hot water 414, and tea 416 configured to receive each associated solenoid valve for operation. Each distribution port 412 414 416 may be vertically separated by approximately 1.06 inches and displaced from the vertical axis 350 by approximately 0.19 inches. FIG. 4B may clearly indicate each distribution port 412 414 416 oriented approximately normal to the vertical axis 350. Each exit fitting 142 144 146 may also be indicated aligned approximately normal to both the distribution ports 412 414 416 as well as the vertical axis 350. A lateral dimension may be defined as normal to the vertical axis and aligned with wings of the aircraft in which the manifold is installed. Here, a lateral dimension of the manifold body may be approximately 1.819 inches.

Clearly seen in FIG. 4C may be the center channel 140 detailing a diameter of the center channel 140 being smallest in the vertical center of the manifold body 110. In one embodiment of the inventive concepts disclosed herein, the center channel inside diameter is approximately 0.19 inches at its smallest and opening to a wider inside diameter at each of the top vent port 120 (approximately 0.503 inches) and the bottom flush port 130 (approximately 0.258 inches).

Here, one may visualize a shape of a core pin used in molded construction of the manifold body 110. If a single core pin were used in molded construction, the single pin creating the top vent port 120, the center channel 140, and the bottom flush port 130 would not be removable from the finished molded manifold body 110 product. However, should two core pins which meet in the vertical center of the manifold body 110 be used, each core pin may be removable after the mold has cured. In this manner, each of the opposite ports, the top vent port 120 and the bottom flush port 130 may maintain a function during construction as well as a function during operation.

FIG. 5

Figure 5A:
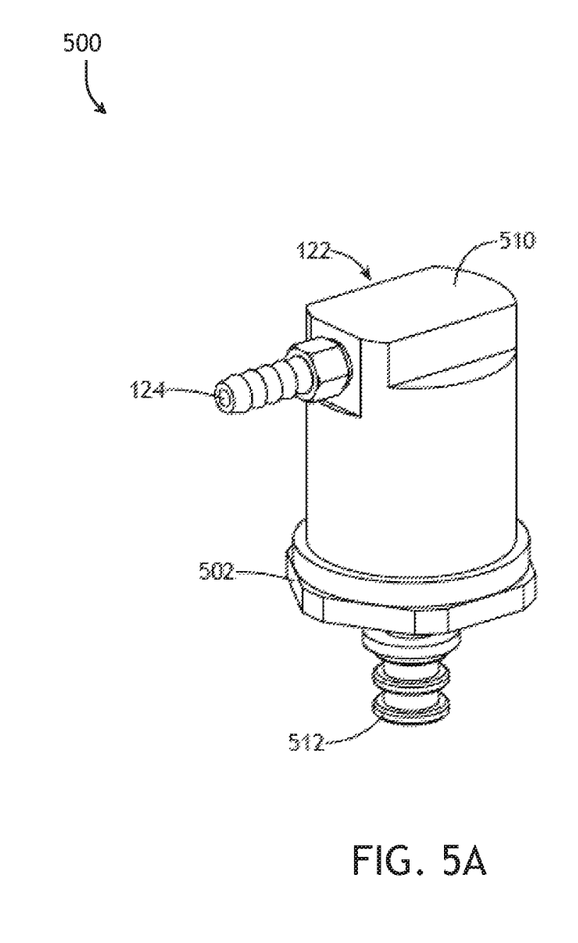
FIGS. 5A-5C are diagrams of a vent valve in accordance with one embodiment of the inventive concepts disclosed herein.
Figure 5B:
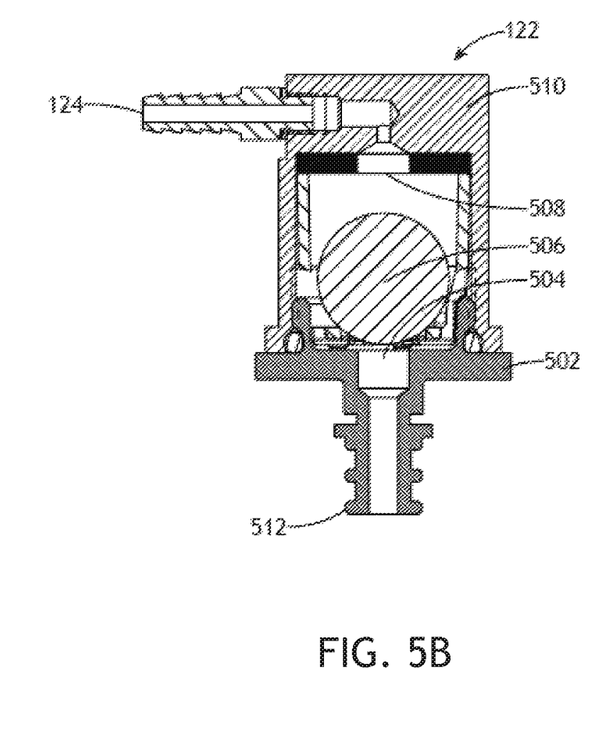
Figure 5C:
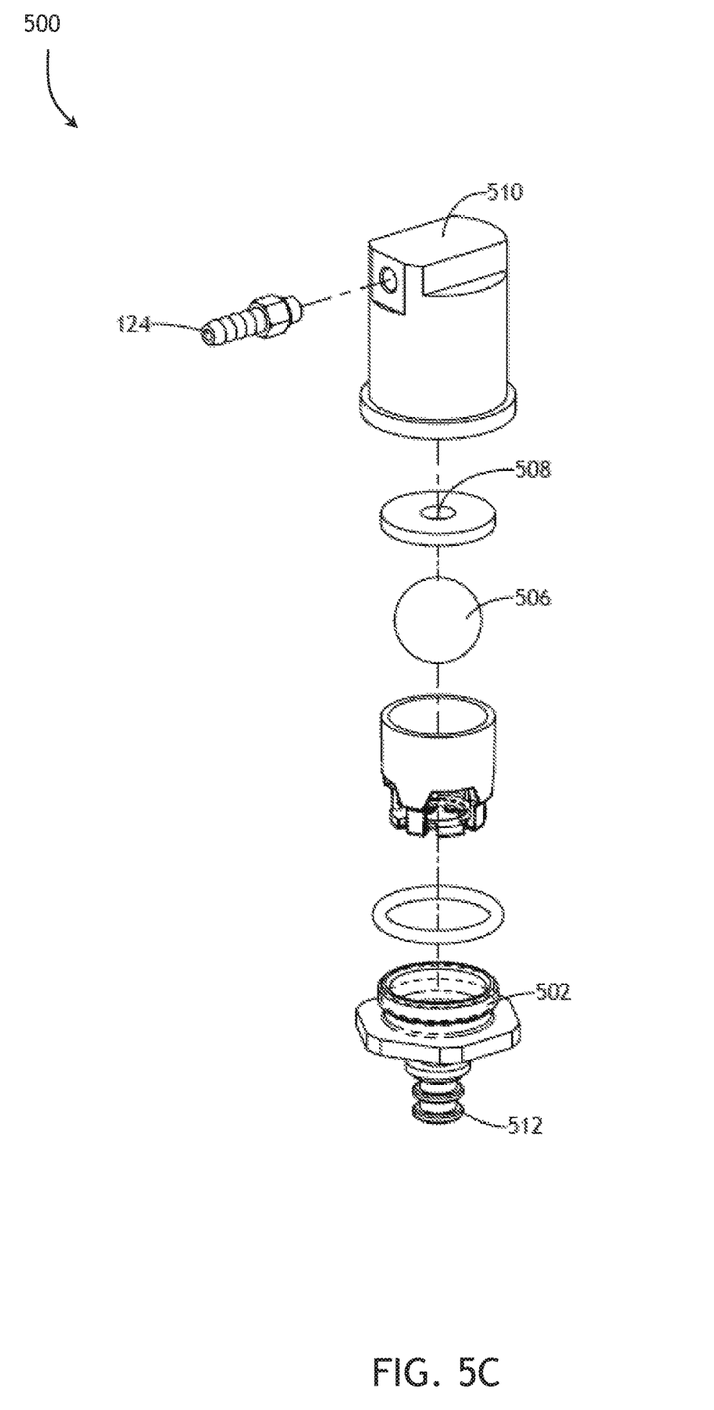

Referring now to FIGS. 5A-5C, diagrams of a vent valve in accordance with one embodiment of the inventive concepts disclosed herein is shown. Vent valve views 500 may indicate each element of the vent valve 122. Vent valve 122 may include a vent valve base 502, a lower port 504, a vent valve ball 506, an upper port 508, a vent valve housing 510, and a connection port 512.

In operation, with the vent valve 122 empty, the aircraft water supply may become pressurized, as the tank 150, tank line 158, and center channel 140 may fill, the vent valve ball 506 may remain is the lower position allowing air to pass through the vent valve 122 and out through the vent valve fitting 124. Once the water level reaches the vent valve ball 506, the ball may float and rise to mate with the upper port 508 and prevent pressurized water from the center channel 140 to escape the system.

As the aircraft water supply may become unpressurized, an operator may open the tank valve 162 allowing a system drain of the hot beverage maker. Here, the vent valve ball 506 may fall as water may flow out of the valve 122 allowing air to ventilate the center channel 140 as well as the tank line 158 and the tank 150.

FIG. 6

Figure 6:
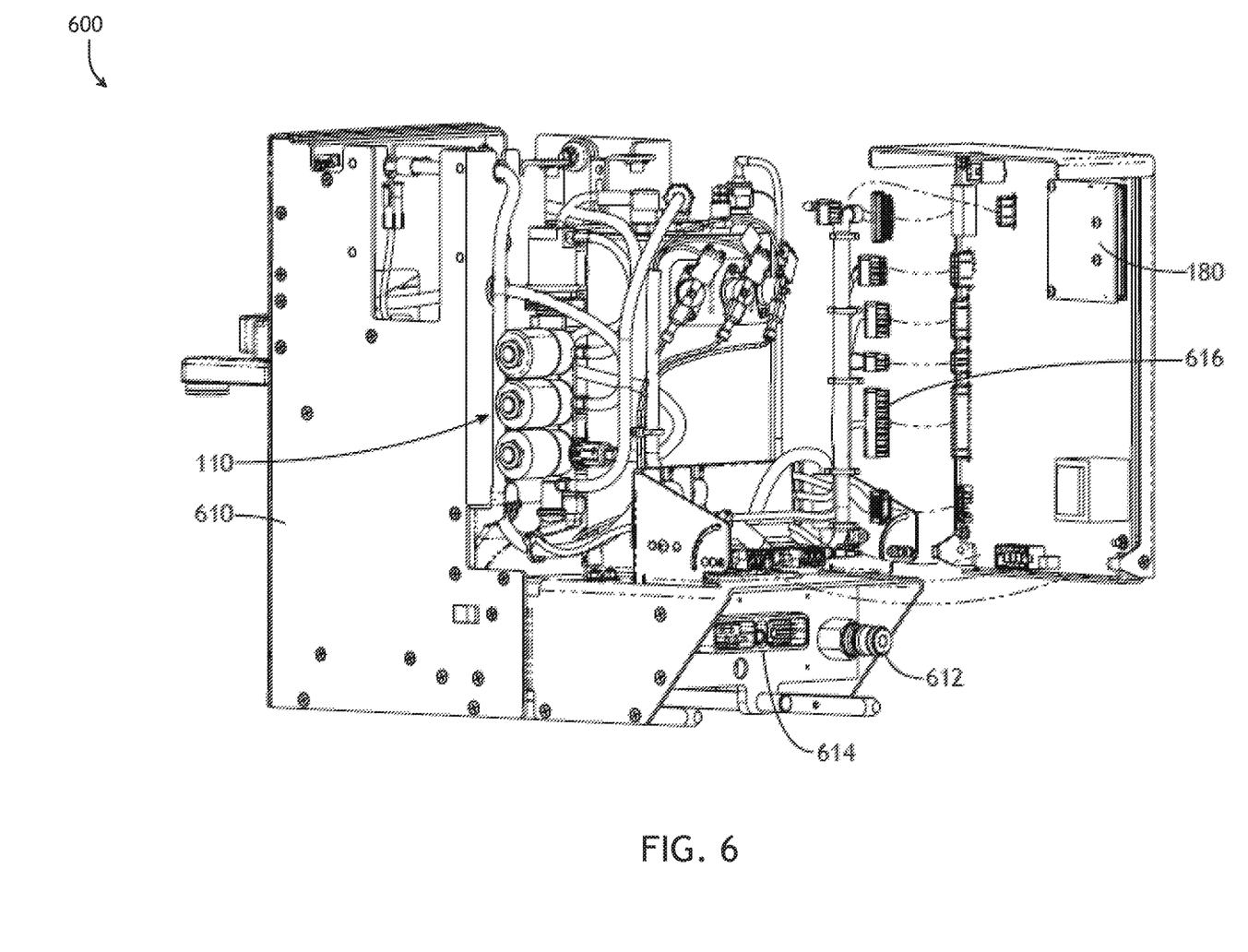
FIG. 6 is a diagram of an exemplary hot beverage maker with a manifold assembly installed in accordance with one embodiment of the inventive concepts disclosed herein.

Referring now to FIG. 6, a diagram of an exemplary hot beverage maker with a manifold assembly installed in accordance with one embodiment of the inventive concepts disclosed herein is shown. Hot beverage maker view 600 may detail each element of the overall hot beverage system. A hot beverage maker 610 may include an aircraft water inlet 612, a power connector 614, and a manifold wiring harness 616. Controller 180 may be sited on a back cover where it may maintain data connectivity with each of the elements including the manifold assembly via a manifold wiring harness 616.

CONCLUSION

As will be appreciated from the above description, embodiments of the inventive concepts disclosed herein may provide a lightweight, molded manifold assembly solution comprising each desired element incorporated within the manifold assembly.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:
1. A manifold assembly system, comprising:
a manifold body configured for coupling with an aircraft beverage maker, the manifold body having:
  (1) a center channel having an input port,
  (2) at least three distribution ports aligned along, oriented normal in a range of 72 to 108 degrees to the center channel, and in fluid connectivity with the center channel,
  (3) a top vent port aligned and in fluid connectivity with the center channel, and
  (4) a bottom flush port aligned and in fluid connectivity with the center channel;
a solenoid valve mechanically coupled and associated with each distribution port of the at least three distribution ports;
a vent valve mechanically coupled and associated with the top vent port;
an exit fitting associated with each distribution port of the at least three distribution ports, each exit fitting in valved fluid connectivity with its associated distribution port;
a controller operatively coupled with each solenoid valve;
a tangible, non-transitory memory configured to communicate with the controller, the tangible, non-transitory memory having instructions stored therein that, in response to execution by the controller, cause the controller to:
receive an input from a user of an aircraft hot beverage device; and
control a flow of hot water from the center channel to at least one of the exit fittings via a signal sent to operate at least one solenoid valve.
2. The manifold assembly system of claim 1, wherein the manifold body is constructed of molded material using two core pins to create the center channel, a first core pin sized to create the center channel and the top vent port and a second core pin sized to create center channel and the bottom flush port.

3. The manifold assembly system of claim 1, wherein an exit fitting nearest the flush port further comprises a flow regulator integrated within the exit fitting.

4. The manifold assembly system of claim 1, wherein the center channel includes a midpoint diameter at a vertical midpoint smaller than a diameter at either a bottom vertical end proximal with the flush port and a top vertical end proximal with the vent port.

5. The manifold assembly system of claim 1, wherein each of the at least three distribution ports are configured to removably receive a solenoid valve, the solenoid valve configured with a plunger configured to physically control the flow of hot water from the center channel to at least one of the exit fittings.

6. The manifold assembly system of claim 1, wherein the manifold assembly system further comprises a flush port plug mechanically coupled with and associated with the bottom flush port.

7. The manifold assembly system of claim 1, wherein the at least three distribution ports aligned along and in fluid connectivity with the center channel further comprise a brew distribution port, a hot water distribution port, and a tea distribution port.

8. The manifold assembly system of claim 4, wherein the midpoint diameter is 0.152-0.228 inches and the vertical midpoint is 1.802-2.702 inches distal from the top vertical end.

9. The manifold assembly system of claim 1, wherein the manifold body maintains a vertical dimension of 3.6-5.4 inches and a horizontal dimension of 1.456-2.184 inches.

10. The manifold assembly system of claim 1, wherein the vent port maintains a diameter of 0.403-0.603 inches and the flush port maintains a diameter of 0.207-0.309 inches.

11. The manifold assembly system of claim 1, wherein the manifold body further comprises at least one chassis connection for mechanically coupling to a beverage maker chassis.

12. A manifold assembly, comprising:
a manifold body having a top end and an opposite bottom end;
a center channel extending along a vertical axis from the manifold body top end to the manifold body bottom end, the center channel having an input port;
a top vent port proximal with the manifold body top end and in fluid connectivity with the center channel;
a top vent valve coupled with the top vent port, the top vent valve comprising a connection port, a float, and a vent fitting;
a bottom flush port proximal with the manifold body bottom end and in fluid connectivity with the center channel;
the top vent port, the center channel, and the bottom vent port comprising an open center conduit, the open center conduit aligned with the vertical axis;
at least three distribution ports aligned along the vertical axis and oriented approximately normal to the vertical axis, the at least three distribution ports in fluid connectivity with the center channel, each distribution port configured to receive a solenoid valve; and
an exit fitting associated with each distribution port of the at least three distribution ports, each exit fitting oriented normal in a range of 72 to 108 degrees with both of the vertical axis and its associated distribution port, each exit fitting in valved fluid connectivity with its associated distribution port, at least one exit fitting comprises a flow regulator.

13. The manifold body of claim 12, wherein the top vent valve is configured to vent each of the open center conduit, a hot water tank, and a tank line during a system fill, the top vent valve further configured to enable a drain of the open center conduit, the tank line, and the hot water tank during a system drain.

14. The manifold body of claim 12, wherein the manifold body is constructed of molded material using two oppositely aligned core pins to create the center channel, a first core pin sized to create the center channel and the top vent port and a second core pin sized to create center channel and the bottom flush port.

15. The manifold body of claim 12, wherein the at least one exit fitting comprising a flow regulator is proximal with the bottom flush port.

16. The manifold body of claim 12, wherein the center channel includes a midpoint diameter at a vertical midpoint smaller than a diameter at either the manifold body top end and the manifold body bottom end.

17. The manifold body of claim 12, wherein the solenoid valve comprises a plunger configured to physically control a flow of hot water from the center channel to at least one of the exit fitting.

18. The manifold body of claim 12, wherein the at least three distribution ports aligned along and in fluid connectivity with the center channel further comprise a brew distribution port, a hot water distribution port, and a tea distribution port.

19. The manifold body of claim 12, wherein the midpoint diameter is 0.152-0.228 inches and the vertical midpoint is 1.802-2.702 inches distal from the top vertical end.

20. The manifold body of claim 12, wherein the manifold body maintains a vertical dimension of 3.6-5.4 inches and a horizontal dimension of 1.456-2.184 inches.

\* \* \* \* \*